(12) United States Patent
Tenny et al.

(10) Patent No.: US 11,889,415 B2
(45) Date of Patent: Jan. 30, 2024

(54) METHOD AND APPARATUS FOR WIRELESS RECEPTION

(71) Applicant: MEDIATEK SINGAPORE PTE. LTD., Singapore (SG)

(72) Inventors: Nathan Edward Tenny, San Jose, CA (US); Tao Chen, Beijing (CN); Chia-Chun Hsu, Hsinchu (TW)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 43 days.

(21) Appl. No.: 16/922,838

(22) Filed: Jul. 7, 2020

(65) Prior Publication Data

US 2021/0321329 A1 Oct. 14, 2021
US 2022/0030516 A9 Jan. 27, 2022

Related U.S. Application Data

(63) Continuation of application No. PCT/CN2019/095392, filed on Jul. 10, 2019.

(30) Foreign Application Priority Data

Jun. 23, 2020 (CN) .......................... 202010580251.7

(51) Int. Cl.
*H04W 52/02* (2009.01)
*H04W 92/18* (2009.01)

(52) U.S. Cl.
CPC ..... *H04W 52/0216* (2013.01); *H04W 52/028* (2013.01); *H04W 52/0248* (2013.01); *H04W 92/18* (2013.01)

(58) Field of Classification Search
CPC ......... H04W 52/0216; H04W 52/0248; H04W 52/028; H04W 92/18
See application file for complete search history.

(56) References Cited

U.S. PATENT DOCUMENTS

| 10,834,704 | B2* | 11/2020 | Huang ............... H04W 72/0446 |
| 2018/0302886 | A1* | 10/2018 | Pan ....................... H04W 72/23 |
| 2019/0029015 | A1 | 1/2019 | Seo |
| 2019/0098649 | A1 | 3/2019 | Baghel et al. |
| 2019/0159018 | A1* | 5/2019 | Basu Mallick ....... H04W 8/005 |

(Continued)

FOREIGN PATENT DOCUMENTS

| CN | WO2018228127 A1 * | 12/2018 | ............ H04W 52/02 |
| CN | 109246659 A | 1/2019 | |

(Continued)

OTHER PUBLICATIONS

3GPP_TR_37.985_version_16.0.0_Release_16.pdf, 3GPP, 2020.*

(Continued)

*Primary Examiner* — Kodzovi Acolatse
*Assistant Examiner* — Anindita Sen
(74) *Attorney, Agent, or Firm* — Oblon, McClelland, Maier & Neustadt, L.L.P.

(57) ABSTRACT

Aspects of the disclosure provide methods and apparatuses for wireless communication. In some embodiments, a first mobile device can receive a first indication of a first transmit activity pattern associated with a second mobile device that transmits data to the first mobile device via a radio interface without passing through a base station. The first mobile device can compute a first receive activity pattern that is inclusive of at least the first transmit activity pattern. The first mobile device monitors the radio interface according to the first receive activity pattern.

18 Claims, 8 Drawing Sheets

(56) References Cited

U.S. PATENT DOCUMENTS

| | | | | |
|---|---|---|---|---|
| 2020/0053699 A1* | 2/2020 | Chen | ............... | H04W 4/44 |
| 2020/0053768 A1* | 2/2020 | Chen | ............... | H04W 72/1263 |
| 2020/0229145 A1* | 7/2020 | Kang | ............... | H04W 72/23 |
| 2020/0304969 A1* | 9/2020 | Basu Mallick | ............... | H04W 4/40 |
| 2020/0314955 A1* | 10/2020 | Velev | ............... | H04W 48/16 |
| 2020/0314960 A1* | 10/2020 | Basu Mallick | ............... | H04L 5/0053 |
| 2020/0367234 A1* | 11/2020 | Bergström | ............... | H04L 5/0082 |
| 2021/0045178 A1* | 2/2021 | Kung | ............... | H04W 80/02 |
| 2021/0297842 A1* | 9/2021 | Shrivastava | ............... | H04W 28/24 |
| 2021/0329613 A1* | 10/2021 | Luo | ............... | H04W 76/14 |

FOREIGN PATENT DOCUMENTS

| | | | | |
|---|---|---|---|---|
| EP | 3672338 B1 * | 11/2022 | ............... | H04W 4/40 |
| WO | WO2017213687 A1 * | 12/2017 | ............... | H04W 76/04 |
| WO | WO-2017213687 A1 * | 12/2017 | ............... | H04W 52/0216 |
| WO | WO-2018228127 A1 * | 12/2018 | ............... | H04W 24/10 |

OTHER PUBLICATIONS

3GPP_TR_37.985_version_16.0.0_Release_16.pdf, 3GPP, 2020 (Year: 2020).*

Combined Taiwanese Office Action and Search Report dated Nov. 26, 2020 in corresponding Taiwanese Patent Application No. 109122495 (with English Translation of Category of Cited Documents), 7 pages.

Combined Chinese Office Action and Search Report dated May 28, 2023 in Chinese Application No. 202010580251.7 (with English translation of Category of Cited Documents), 7 pages.

* cited by examiner

METHOD AND APPARATUS FOR WIRELESS RECEPTION

INCORPORATION BY REFERENCE

This present disclosure claims the benefit of International Application No. PCT/CN2019/095392, "Discontinuous reception on a sidelink interface" filed on Jul. 10, 2019, and Chinese patent application No. 202010580251.7, filed on Jun. 23, 2020. The entire disclosures of the prior applications are hereby incorporated by reference in their entirety.

TECHNICAL FIELD

The present disclosure describes embodiments generally related to vehicular communication.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

For vehicle-to-everything (V2X) applications, some devices can be coupled to vehicles that can provide power to the devices. However, some devices may be battery-powered, such as mobile devices carried by cyclists, pedestrians and the like. The battery-powered mobile devices can benefit significantly from power saving, and may need to conserve power during operation accordingly.

SUMMARY

Aspects of the disclosure provide methods and apparatuses for wireless communication. In some embodiments, a first mobile device can receive a first indication of a first transmit activity pattern associated with a second mobile device that transmits data to the first mobile device via a radio interface without passing through a base station. The first mobile device can compute a first receive activity pattern that is inclusive of at least the first transmit activity pattern. The first mobile device monitors the radio interface according to the first receive activity pattern.

In some examples, the first mobile device receives a second indication of a second transmit activity pattern associated with a third mobile device that transmits data to the first mobile device directly via the radio interface, and computes a second receive activity pattern that is inclusive of at least the first transmit activity and second transmit activity pattern. Then, the first mobile device monitors the radio interface according to the second receive activity pattern.

In some embodiments, the first mobile device resets a timer in response to a reception of a packet of data transmitted from the second mobile device, and adjusts the first receive activity pattern to include an adjusted first transmit activity pattern with an increased cycle time. The first mobile device monitors the radio interface according to the adjusted first receive activity pattern when the timer expires.

In an embodiment, the first mobile device receives an end indication of service data transmission from the second mobile device. The first mobile device updates the first receive activity pattern to include an adjusted first transmit activity pattern with an increased cycle time, and monitors the radio interface according to the updated first receive activity pattern.

In some examples, the first mobile device starts a timer in response to the end indication. The first mobile device can monitor the radio interface according to the first receive activity pattern before the timer expires, and monitor the radio interface according to the updated first receive activity pattern when the timer expires.

In an example, the end indication is an end marker in a data transmission. In another example, the end indication is a buffer status report that indicates data in a transmit buffer of the second mobile device has been transmitted and received by the first mobile device.

In some embodiments, the first mobile device detects a reception failure of a packet of data transmitted from the second mobile device, and sends a negative acknowledgement (NACK) to the second mobile device in response to the reception failure. Further, the first mobile device monitors the radio interface after the sending of the NACK, for a time duration that allows a reception of a retransmission of the data from the second mobile device.

In some embodiments, the first receive activity pattern is inclusive of at least one of a time dimension of a resource pool for a connectionless service, and a transmit activity pattern associated with a connection-based service.

In an example, the first mobile device receives the first indication in a message of a sidelink radio resource control (RRC) protocol. In another example, the first mobile device receives the first indication in a control element of a sidelink medium access control (MAC) protocol.

In some embodiments, the first mobile device monitors the radio interface in an on-duration of the first receive activity pattern and powers off receiving circuitry in an off-duration of the first receive activity pattern.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Aspects of the disclosure provide power conserving techniques to be used by wireless communication devices used in vehicle-to-everything (V2X) applications. In some examples, the power conserving techniques can be used by a user equipment (UE) device when the UE device monitors and receives signals from direct communication links from other UE devices. The direct communication links are between the UE device and the other UE devices without using network infrastructure as an intermediary.

Specifically, according to some aspects of the disclosure, the UE device receives indications of transmit activity patterns of one or more other UE devices, and determines a receive activity pattern based on the transmit activity patterns. The UE device can switch between an active receiving state and a power saving state according to the receive activity pattern. Thus, the UE device can ensure data reception and can save power.

Figure 1:
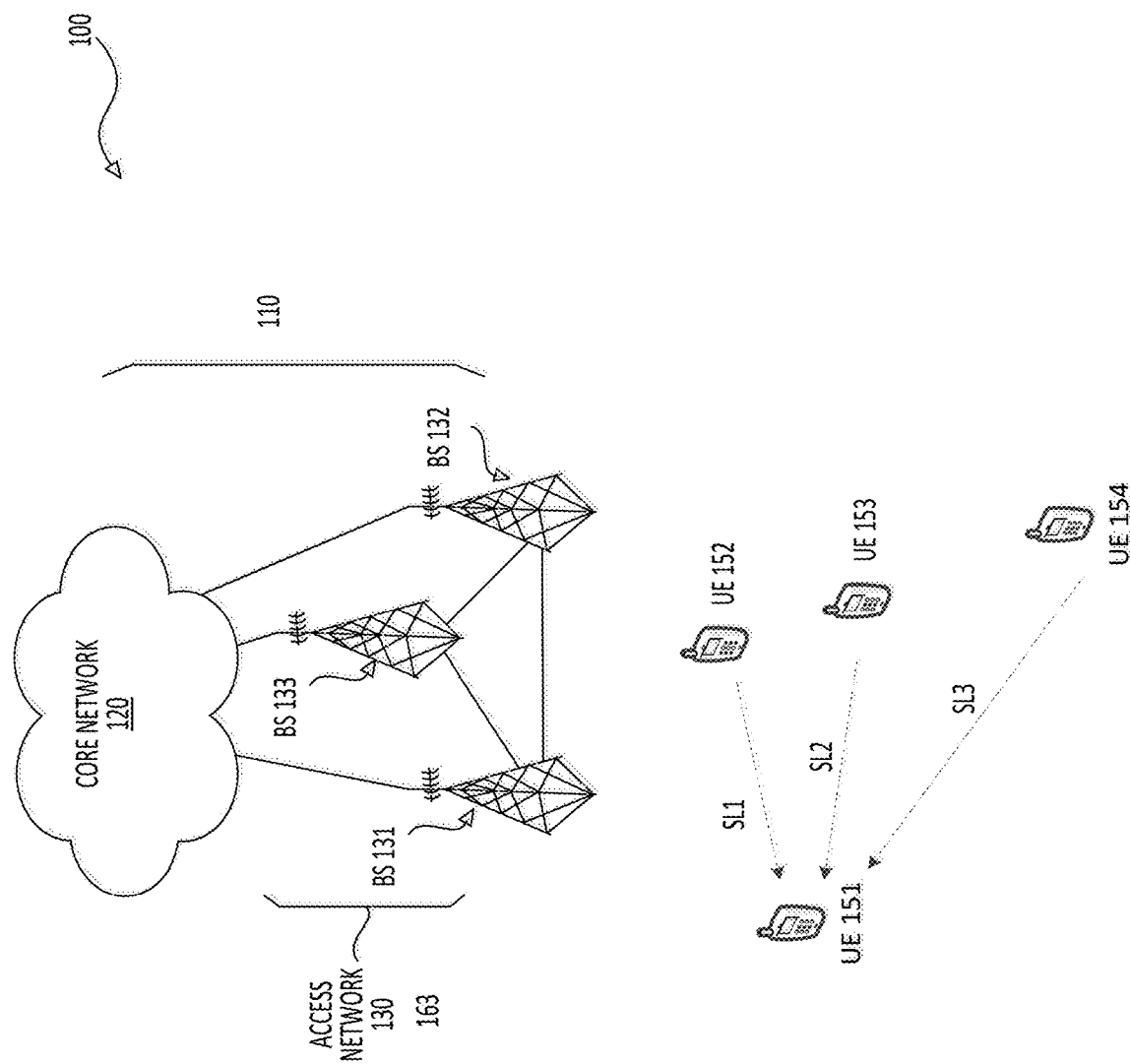
FIG. 1 shows a diagram of a wireless communication system according to some embodiments of the disclosure.

FIG. 1 shows a diagram of a wireless communication system 100 according to some embodiments of the disclosure. The wireless communication system 100 includes a plurality of wireless communication devices, such as UE 151-154. At least one of the UE devices, such as the UE 151 can determine a receive activity pattern based on transmit activity patterns of one or more other UE devices, such as UE 152-154, and can switch between an active receiving state and a power saving state according to the receive activity pattern.

Specifically, in the FIG. 1 example, the wireless communication system 100 includes a network system 110 that includes a core network 120 and an access network 130 coupled together. The network system 110 can be any suitable network system. In an example, the network system 110 is a 5G system (5GS) that is configured based on the new radio (NR) technology. Then, the core network 120 can be a 5G core (5GC) network and the access network 130 can be a next generation (NG) radio access network (NG-RAN) for air interface. The NG-RAN may use either NR or evolved universal terrestrial radio access (E-UTRA) radio technology, or a mix of both at different network nodes. It is noted that the wireless communication system 100 can include other suitable components, such as an application server system (not shown).

In another example, the network system 110 is an evolved packet system (EPS) that is configured based on LTE technology. Then, the core network 120 can be an evolved packet core (EPC) network and the access network 130 can be an evolved universal terrestrial radio access network (E-UTRAN) 130 for air interface. The E-UTRAN may use E-UTRA radio technology.

In another example, the network system 110 is implemented using a mix of LTE technology and NR technology. For example, the network system 110 includes a first sub-system (not shown) based on LTE technology and a second sub-system (not shown) based on the NR technology. The two sub-systems are suitably coupled together.

The access network 130 includes one or more base stations that air-interface with user equipment using suitable technology and can provide control plane and user plane to user equipment. The base stations in the access network 130 are generally fixed stations that communicate with the user equipment and can also be referred to using other suitable terminology, such as evolved Node-B (eNB), a next generation Node-B (gNB), a base transceiver system, an access point and the like.

In the FIG. 1 example, the network system 110 may provide wireless communication service to the UE devices, such as UE 151-154, and other devices that are not shown, via radio interfaces that can be referred to as Uu interfaces in some examples. A radio interface includes radio resources that are used to exchange signals between the communication participants. For example, UE 151 can transmit signals to and/or receive signals from the network system 110 via a Uu interface between the network system 110 and the UE 151; UE 152 can transmit signals to and/or receive signals from the network system 110 via a Uu interface between the network system 110 and the UE 152; UE 153 can transmit signals to and/or receive signals from the network system 110 via a Uu interface between the network system 110 and the UE 153; and UE 154 can transmit signals to and/or receive signals from the network system 110 via a Uu interface between the network system 110 and the UE 154.

Further, in the FIG. 1 example, a radio interface, that is referred to as a sidelink interface (also referred to as PC5 interface), can be setup directly between UE devices. For example, the UE 151 and UE 152 can perform communication directly via the sidelink interface without going through a base station; the UE 151 and UE 153 can perform communication directly via the sidelink interface without going through a base station; and the UE 151 and UE 154 can perform communication directly via the sidelink interface without going through a base station.

The UE 151-154 can be any suitable device respectively, such as a vehicle with embedded wireless communication component, a bicycle with embedded wireless communication component, a street light with embedded wireless communication component, a sign with embedded wireless communication component, a cell phone, a smart phone, a smart watch, a wearable device, a tablet computer, a laptop computer, and the like. The direct communication between the UE 151-154 in the wireless communication network 100 can be referred to as sidelink communication. The sidelink communication can be vehicle to vehicle (V2V) communication, vehicle to pedestrian (V2P) communication, vehicle to device (V2D) communication, user equipment to user equipment communication, cell phone to cell phone communication, device to device (D2D) wireless communication, and the like.

The sidelink interface provides radio resources for direct radio links. For example, the sidelink interface can provide radio resources for a first sidelink (SL1) for data transmission from UE 152 to UE 151; the sidelink interface can provide radio resources for a second sidelink (SL2) for data transmission from UE 153 to UE 151; the sidelink interface can provide radio resources for a third sidelink (SL3) for data transmission from UE 154 to UE 151. It is noted that, in some examples, the sidelinks are bi-directional radio links; the first sidelink SL1 can also provide data transmission from UE 151 to UE 152; the second sidelink SL2 can also provide data transmission from UE 151 to UE 153; the third sidelink SL3 can also provide data transmission from UE 151 to UE 154. In some other examples, the sidelinks SL1, SL2 and SL3 are uni-directional, and the sidelink interface can also provide radio resources for a sidelink (not shown) for data transmission from UE 151 to UE 152; the sidelink interface can also provide radio resource for a sidelink (not shown) for data transmission from UE 151 to UE 153; the sidelink interface can also provide radio resource for a sidelink (not shown) for data transmission from UE 151 to UE 154.

In the FIG. 1 example, the UE 151 can receive data transmitted from other UE devices via sidelinks, such as data transmitted from the UE 152 via the first sidelink SL1, data transmitted from the UE 153 via the second sidelink SL2, data transmitted from the UE 154 via the radio sidelink SL3, and the like. In some embodiments of the disclosure, the UE 151 can determine a receive activity pattern based on transmit activity pattern(s) of UE device(s) that transmit data to the UE 151, and then switch between an active receiving state and a power saving state based on the receive activity pattern.

According to an aspect of the disclosure, UEs, such as the UE 151 is configured to have a sidelink discontinuous reception (DRX) mode. In the sidelink DRX mode, the UE 151 can switch between an active receiving state and power saving state according to a receive activity pattern. The receive activity pattern defines active time durations (on-durations) and inactive time durations (off-durations) for receive activity. In an active time duration, the UE 151 is in the active receiving state, and can receive data. In an inactive time duration, the UE1 151 is in the power saving state (e.g., receiving circuitry is in a low power mode) and does not receive data.

Further, according to an aspect of the disclosure, the UEs, such as the UE 151 can aggregate transmit activity patterns of other UEs, and determine a receive activity pattern that is inclusive of the transmit activity patterns. For example, the UE 151 can receive a first indication that is indicative of a first transmit activity pattern of the UE 152, a second indication that is indicative of a second transmit activity pattern of the UE 153, and a third indication that is indicative of a third transmit activity pattern of the UE 154. The first transmit activity pattern can specify scheduled (or allocated) data transmit time duration(s) of the UE 152 of the sidelink SL1. The second transmit activity pattern can specify scheduled (or allocated) data transmit time duration(s) of UE 153 of the SL2. The third transmit activity pattern can specify scheduled (or allocated) data transmit time duration(s) of UE 154 of the SL3. The UE 151 can compute a receive activity pattern that specifies time durations for the active receiving state by the UE 151. The time durations for the active receiving state can include the scheduled (or allocated) data transmit time duration(s) of the UE 152, the scheduled (or allocated) data transmit time duration(s) of the UE 153 and the scheduled (or allocated) data transmit time duration(s) of the UE 154.

In some embodiments, the indication of the transmit activity pattern is carried in a configuration message, such as a PC5 radio resource control (RRC) configuration message. Using a uni-directional sidelink as an example, a UE at the reception side of the sidelink can receive a sidelink configuration, such as in a message of a PC5-RRC protocol, for the sidelink from a UE at the transmission side of the sidelink. The sidelink configuration can include configuration information for one or more protocol layers of a protocol stack governing communication between the transmission side UE and reception side UE.

Thus, in some embodiments, when an activity pattern, such as a transmit activity pattern, a configured grant (CG) activity pattern, a semi-persistent scheduling (SPS) pattern, and the like is established, the activity pattern can be included in the PC5-RRC configuration message. It is noted that, in some other embodiments, other means of communicating the activity pattern, such as a medium access control (MAC) control element (CE) sent from the transmission side UE (e.g., UE 152, UE 153, UE 154) to the reception side UE (e.g., UE 151) can be used.

In some embodiments, the UE 151 can receive multiple transmit activity patterns. In some examples, the multiple transmit activity patterns are associated with different transmission side UEs, such as respectively from UE 152, UE 153 and UE 154. In some other examples, the multiple transmit activity patterns are associated with different services from the same transmission side UE.

Figure 2:
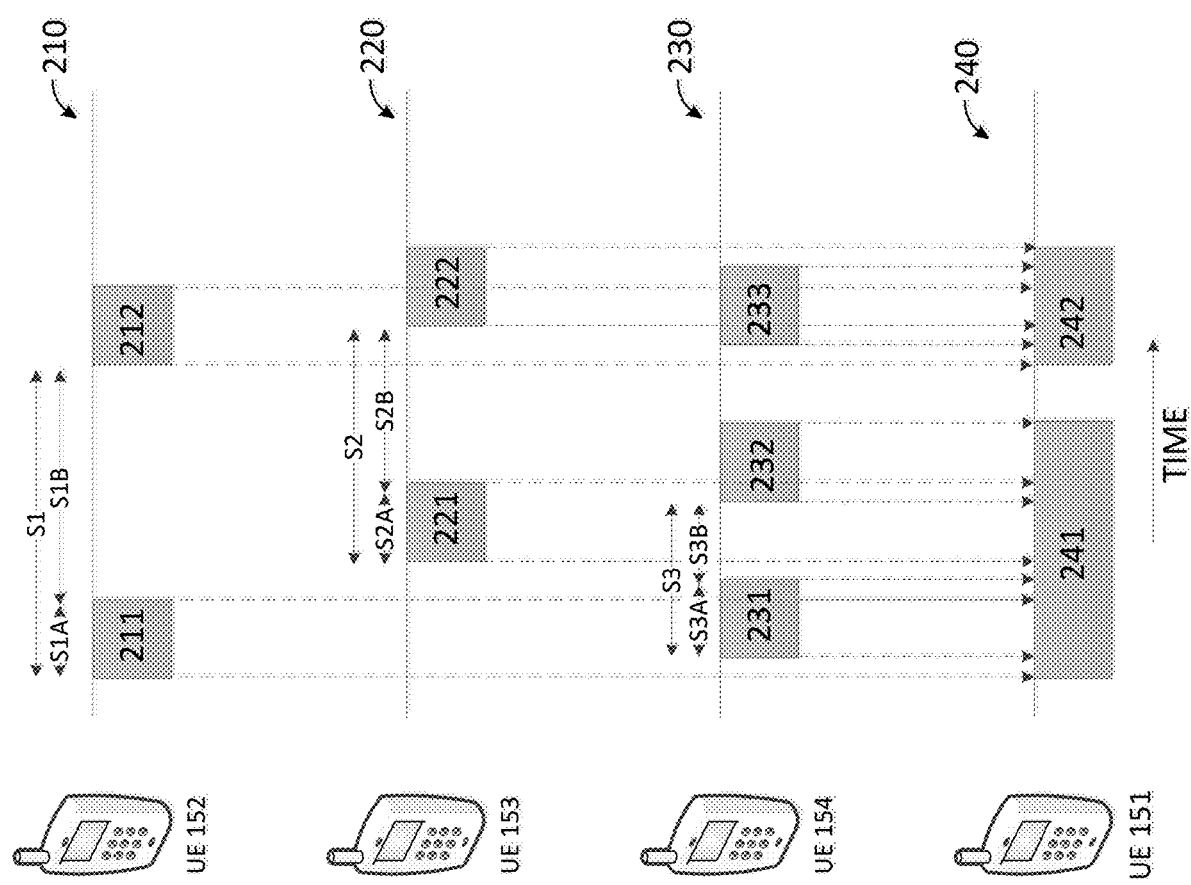
FIG. 2 shows an example of receive activity pattern calculation according to some embodiment of the disclosure.

FIG. 2 shows an example of receive activity pattern calculation according to some embodiment of the disclosure. Using the UEs in FIG. 1 as an example, the UE 151 receives multiple services from different transmission side UEs, such as UE 152, UE 153 and UE 154. Each of the services can have its own activity pattern (also referred to as data pattern for service data). Specifically, the UE 151 receives a first service from UE 152 for example on the first sidelink SL1, the first service has data pattern 210; the UE 151 receives a second service from UE 153 for example on the second sidelink SL2, the second service has data pattern 220; the UE 151 receives a third service from UE 154 for example on the third sidelink SL3, the third service has data pattern 230.

In the FIG. 2 example, the first data pattern 210 includes multiple data transmission occasions, such as shown by 211 and 212, for the first service; the second data pattern 220 includes multiple data transmission occasions, such as shown by 221 and 222, for the second service; the third data pattern 230 includes multiple data transmission occasions, such as shown by 231-233, for the third service. It is noted that the services may have different transmission cycles. In an example, transmission occasions are allocated in time as repetitive slots, and a (transmit/receive) activity cycle is the time duration between a starting point of an active slot (that is, a slot in which a transmission occasion occurs) and a starting point of a next active slot. Each activity cycle includes one or more allocated active slots (also referred to as on-duration) and time between the two active slots that can be referred to as an idle slot (also referred to as off-duration).

For example, the first data pattern 210 has an activity cycle time S1 that includes an active slot S1A and an idle slot S1B; the second data pattern 220 has an activity cycle time S2 that includes an active slot S2A and an idle slot S2B; and the third data pattern 230 has an activity cycle time S3 that includes an active slot S3A and an idle slot S3B as shown in FIG. 2.

It is noted that, in some embodiments, a transmission occasion for a service is a potential transmission occasion that is scheduled and can be used by the transmission side UE to transmit service data for the service. A transmission side UE does not need to transmit on every transmission occasion for the service. Some transmission occasions can be left "unoccupied". In some examples, the reception side UE does not have advance knowledge of which occasions will actually be occupied by traffic (e.g., service data), thus the reception side UE needs to monitor radio signals in all transmission occasions.

In some embodiments, the UE 151 can determine a data pattern 240 (also referred to as receive activity pattern) based on the first data pattern 210, the second data pattern 220 and the third data pattern 230. The data pattern 240 can be used by the UE 151 to switch between an active receiving state and a power saving state. As shown in FIG. 2 example, the data pattern 240 can include a first time duration 241 and a second time duration 242 for monitoring the radio interface in order to receive service data. As shown, the transmission occasions 211, 212, 221, 222, 231-233 are within one of the first time duration 241 and the second time duration 242. Intervals of time not belonging to any transmission occasion (for example, the interval between the end of time duration 232 and the start of time duration 212) may not be allocated to any active time duration in data pattern 240; that is, during these intervals, UE 151 may operate in a power saving state. In some cases, a short interval between transmission occasions (for example, the interval between the end of time duration 231 and the beginning of time duration 221) may be included in the active part of data pattern 240; this may occur, for example, if the interval is too short for UE 151 to effectively power down its receive circuitry in the available time. The judgement as to which intervals should be included in data pattern 240 may be made by the implementation of UE 151.

According to an aspect of the disclosure, while the UE 152, UE 153 and UE 154 are all at the transmission side of sidelinks to the UE 151, the UE 152, UE 153 and UE 154 can independently configure activity pattern(s) for respective service(s) to the UE 151. The UE 151 can aggregate the activity pattern(s) into a receive activity pattern.

Figure 3:
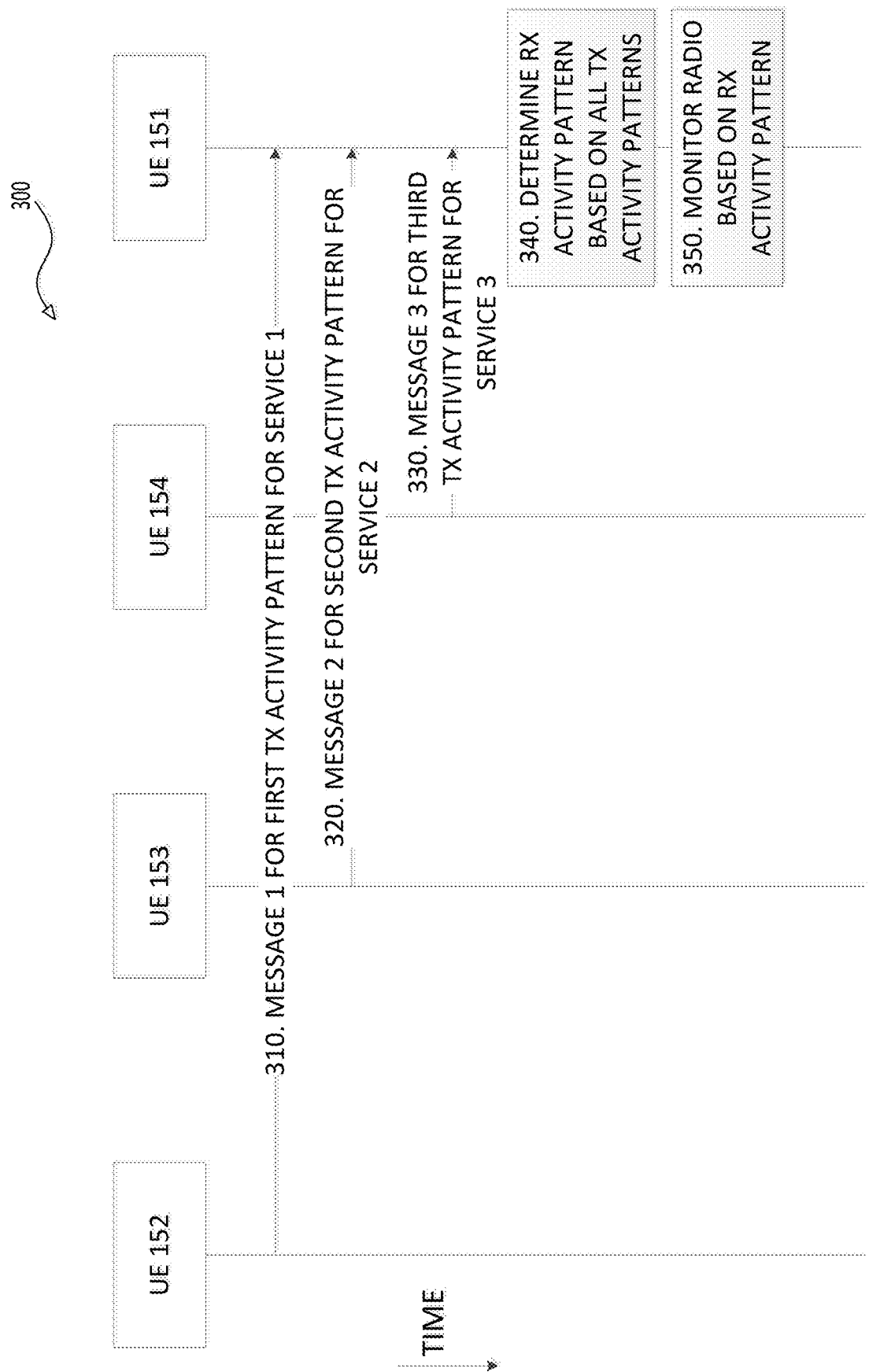
FIG. 3 shows an example of a message flow for configuring activity patterns.

FIG. 3 shows an example of a message flow for configuring activity patterns. In an example, the message flow in FIG. 3 can be used to configure the activity patterns shown in FIG. 2.

For example, as shown by 310, the UE 152 can transmit message 1 (e.g., a configuration message of a PC5-RRC protocol) that includes an indication for a first transmit activity pattern of a first service provided from the UE 152 to the UE 151. Further, as shown by 320, the UE 153 can transmit message 2 (e.g., a configuration message of a PC5-RRC protocol) that includes an indication for a second transmit activity pattern of a second service provided from the UE 153 to the UE 151. Similarly, as shown by 330, the UE 154 can transmit message 3 (e.g., a configuration message of a PC5-RRC protocol) that includes an indication for a third transmit activity pattern of a third service provided from the UE 154 to the UE 151.

According to an aspect of the disclosure, the transmission side UEs can respectively obtain the transmit activity patterns. In some embodiments, the transmit activity patterns are obtained via interaction with a cellar network, such as access network 130. For example, a transmission side UE, such as UE 152, can send a resource request to the access network 130; the access network 130 can respond with a resource grant that identifies radio resources allocated to the UE 152. In some examples, the resource grant is a configured grant (CG) that defines a fixed transmission cycle.

Various techniques can be used to indicate the transmit activity patterns. In an embodiment, a transmit activity pattern can be defined based on parameters, such as a periodicity and/or a time offset. Then, the transmission occasions can be determined based on the periodicity and the time offset (e.g., relative to the system timing).

The UE 151 can determine receive activity pattern shown by 340 based on transmit activity patterns of all of the services, such as the first service, the second service and the third service. Then, UE 151 can monitor the sidelink radio interface according to the receive activity pattern as shown by 350.

While the UEs 152-154 are shown in FIG. 3 as originating their services in close proximity in time, the UEs 152-154 can respectively start services at disparate times. For example, when the UE 151 receives message 1, the UE 151 can determine a first receive activity pattern based on the first transmit activity pattern, and monitor radio interface according to the first receive activity pattern to receive service data of the first service. When the UE 151 receives message 2, the UE 151 can determine a second receive activity pattern based on the first transmit activity pattern and the second transmit activity pattern, and monitor radio interface according to the second receive activity pattern to receive service data of the first service and/or the second service. When the UE 151 receives message 3, the UE 151 can determine a third receive activity pattern based on the first transmit activity pattern, the second transmit activity pattern and the third transmit activity pattern, and monitor radio interface according to the third receive activity pattern to receive service data of the first service/the second service/the third service.

It is noted that, in some examples, when a service is terminated, the UE 151 can re-determine the receive activity pattern based on other services. For example, when the first service is terminated, the UE 151 can re-determine a receive activity pattern based on the second transmit activity pattern and the third transmit activity pattern.

According to an aspect of the disclosure, multiple services may be setup between a same pair of UEs. For example, the UE 152 may deliver multiple services to the UE 151. In some embodiments, the UE 152 can send multiple configuration messages respectively for the multiple services. The multiple configuration messages can indicate transmit activity patterns respectively for the multiple services, and the UE 151 can determine the receive activity pattern by combining the transmit activity patterns respectively for the multiple services in a similar manner as shown in FIG. 2.

In some other embodiments, the UE 152 can combine the transmit activity patterns for the multiple services into a combined transmit activity pattern, and send a message that is indicative of the combined transmit activity pattern to the UE 151. Then, the UE 151 can determine the receive activity pattern based on the combined transmit activity pattern, and monitor the radio interface based on the receive activity pattern.

According to an aspect of the disclosure, services received by a UE, such as the UE 151, can include connection-based services and connectionless services. A connection-based service refers to a service that requires an establishment of a connection between a transmission side UE and a reception side UE before transmission of service data, and requires a management of the connection during the service. A connectionless service refers to a service that may transmit without prior establishment of a connection, such as a broadcast service.

In some embodiments, the connectionless services may require monitoring on a distinguished resource pool or other set of radio resources, which may be common to multiple reception side UEs. For example, the network system 110 can control the sidelink communication, and may configure a common resource pool used for broadcast services that are connectionless services. The time dimension of the common resource pool is indicative of a schedule for service data transmission, and a UE providing a broadcast service can send message or service data using the common resource pool. Further, the time dimension of the common resource pool is indicative of a receive activity pattern that defines a set of occasions for UEs that are interested in receiving the broadcast services to monitor the common resource pool for messages or data to the reception side UEs.

In some embodiments, a connection-based service can be associated with connection-specific or service-specific radio resources, such as a connection-specific or service-specific reception activity pattern, e.g., a DRX cycle, CG pattern, SPS pattern, and the like. In such a situation, a UE that receives multiple connection-based services can construct a UE-specific receive activity pattern by combining the receive activity patterns for the connectionless services (based, e.g., on the common resource pool) and one or more receive activity patterns for connection-based services (e.g., from multiple unicast links).

In some embodiments, the transmit activity pattern may specify a particular transmission time, such as a specific slot or a transmission time interval (TTI) on the sidelink interface. In such a case, the reception side UE can know exactly when to expect that service traffic may come. The reception side UE can wake up from a dormant or sleeping state (power saving state) for the indicated transmission occasions, and if nothing is received on a transmission occasion, the reception side UE may quickly return to the dormant or sleeping state (power saving state) in order to conserve battery power. This pattern of operation is useful for services with periodic traffic, such as the delivery of a basic safety message (BSM) or a similar periodic communication from one or more transmission side UEs.

In other embodiments, the transmission pattern may specify a window of time for the transmission occasion, such as a number of milliseconds for which the reception side UE is expected to monitor. In such a case, the transmission side UE can transmit the service's traffic (if any) during the monitoring window, and the transmission may occur at any time during the monitoring window. The length of the window may provide some scheduling flexibility for the transmission side UE, for instance, if the transmission side UE cannot immediately obtain a grant of resources to transmit at the beginning of the window. In such scenario, the reception side UE may need to remain awake and monitor the sidelink for the duration of the monitoring window. In some examples, the duration of the monitoring window can be referred to as on-duration, and the rest of duration in a cycle (e.g., receive activity cycle) can be referred to as off-duration since the receiving circuitry may be powered off to save power.

In some embodiments, the services can have bursty or aperiodic traffic data, such as proximity information. In an example, the UE 151 is associated with a pedestrian, and the UE 152 is associated with a vehicle. When the vehicle is in proximity to the pedestrian, the UE 152 associated with the vehicle may send proximity information any time in the monitor window to the UE 151 that is associated with the pedestrian. The UE 151 keeps monitoring the radio interface for the duration of the monitor window and is able to receive the proximity information.

According to an aspect of the disclosure, some services having bursty or aperiodic data may experience long intervals of no traffic. In some embodiments, a timer is used by the reception side UE to adjust a monitoring cycle time, such as increasing the cycle time.

In some examples, the UE 152 provides a service with bursty or aperiodic data to the UE 151. In some embodiments, the UE 152 determines a short cycle time T1, a long cycle time T2, and a timer tracking time based on service requirement. The UE 152 informs the UE 151 of the short cycle time T1, the long cycle time T2 and the timer tracking time and the like, using suitable techniques (e.g., configuration message). Accordingly, the UE 151 uses a timer to adjust a cycle time to monitor the radio interface for reception of service data. The UE 152 and the UE 151 can both operate based on the short cycle time T1, the long cycle time T2 and the timer tracking time. In some examples, a shot cycle for the receive activity pattern includes about the same amount of on-duration, and reduced off-duration compared to a long cycle for the receive activity pattern. Thus, using the long cycle time can save power.

Figure 4:
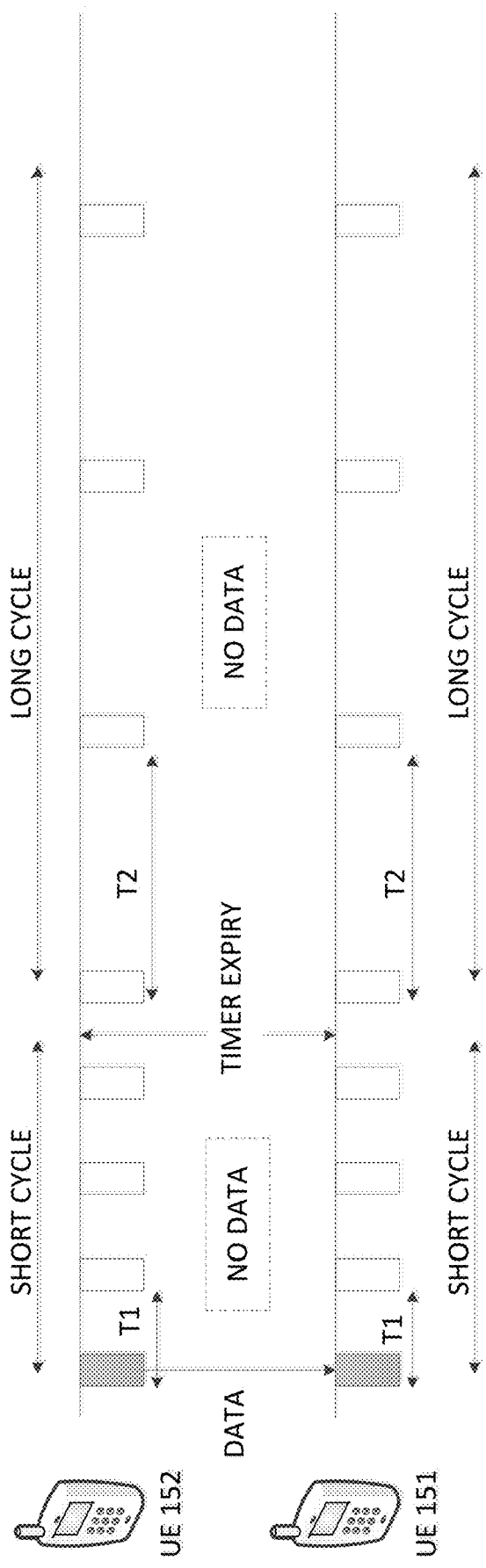
FIG. 4 shows a diagram of monitoring cycle adjustment according to some embodiments of the disclosure.

FIG. 4 shows a diagram of monitoring cycle adjustment according to some embodiments of the disclosure. At the transmission side of the service, initially or at a time service data transmission starts, the UE 152 sends service data via the sidelink SL1, the UE 152 starts (or resets and restarts) a transmission side timer (which expires after the timer tracking time), and uses the short cycle time T1 to define transmission occasions. When no more service data are sent for a certain time, the transmission side timer expires, the UE 152 can use the long cycle time T2 to define transmission occasions.

At the reception side of the service, initially or at a time service data is received, the UE 151 starts (or resets and restarts) the reception side timer (which expires after the timer tracking time), and employs the cycle time T1 as shown in FIG. 4, to monitor the radio interface. The UE 151 wakes up from a power saving state relatively frequently according to the short cycle time, and monitors the radio interface. When no service data is received from the radio interface for a sufficient time during operation of the short cycle, such as when the timer expires, the UE 151 may transition to the long cycle time T2 as shown in FIG. 4, to monitor the radio interface. The UE 151 wakes up from the power saving state and monitors the radio interface less frequently according to the long cycle time T2. The UE 151 may keep the long cycle time until service data is received.

According to an aspect of the disclosure, the long cycle time T2 can be constrained by the latency requirements of the service. For example, if the service has an aperiodic traffic pattern, but requires that any packet at the transmission side UE (e.g., UE 152) must be delivered to the reception side UE (e.g., UE 151) within 10 ms, then the long cycle time T2 cannot be longer than 10 ms. In an embodiment, the UE 152 is configured to determine suitable cycle times, such as short cycle time T1, long cycle time T2, and the like based on latency requirement(s) of the service. The UE 152 can send indication to the UE 151 to inform the UE 151 of the suitable parameters for the service data reception of the service. For example, UE 152 may configure UE 151 with values of the short cycle time T1, the long cycle time T2, and/or the timer tracking time.

According to an aspect of the disclosure, the transition between the short and long cycles is controlled respectively by the transmission side timer at the UE 152 and the reception side timer at the UE 151. In some embodiments, the transmission side timer and the reception side timer are started in response to the same traffic and will expire at substantially the same time if there is no data loss. However, if a data transmission is lost over the air, the reception side timer does not restart and may expire before the transmission side timer. The early expiration of the reception side timer can cause further data loss due to the long cycle time at the reception side and short cycle at the transmission side.

In some embodiments, the transmission side UE and the reception side UE respectively reset their timers in response to acknowledgment of service data reception at the reception side UE. For example, the UE 152 does not reset and restart the transmission side timer at the time of the service data transmission, but resets and restarts the transmission side timer when an acknowledgment is received, the acknowledgement is sent by the UE 151 in response to a reception of the service data. The UE 151 resets and restarts the reception side timer at the time of sending the acknowledgement. In some examples, the acknowledgement is in the form of a hybrid automatic repeat request (HARD) acknowledgement. Acknowledgments may be lost in the air, but there is no risk of data loss.

Figure 5:
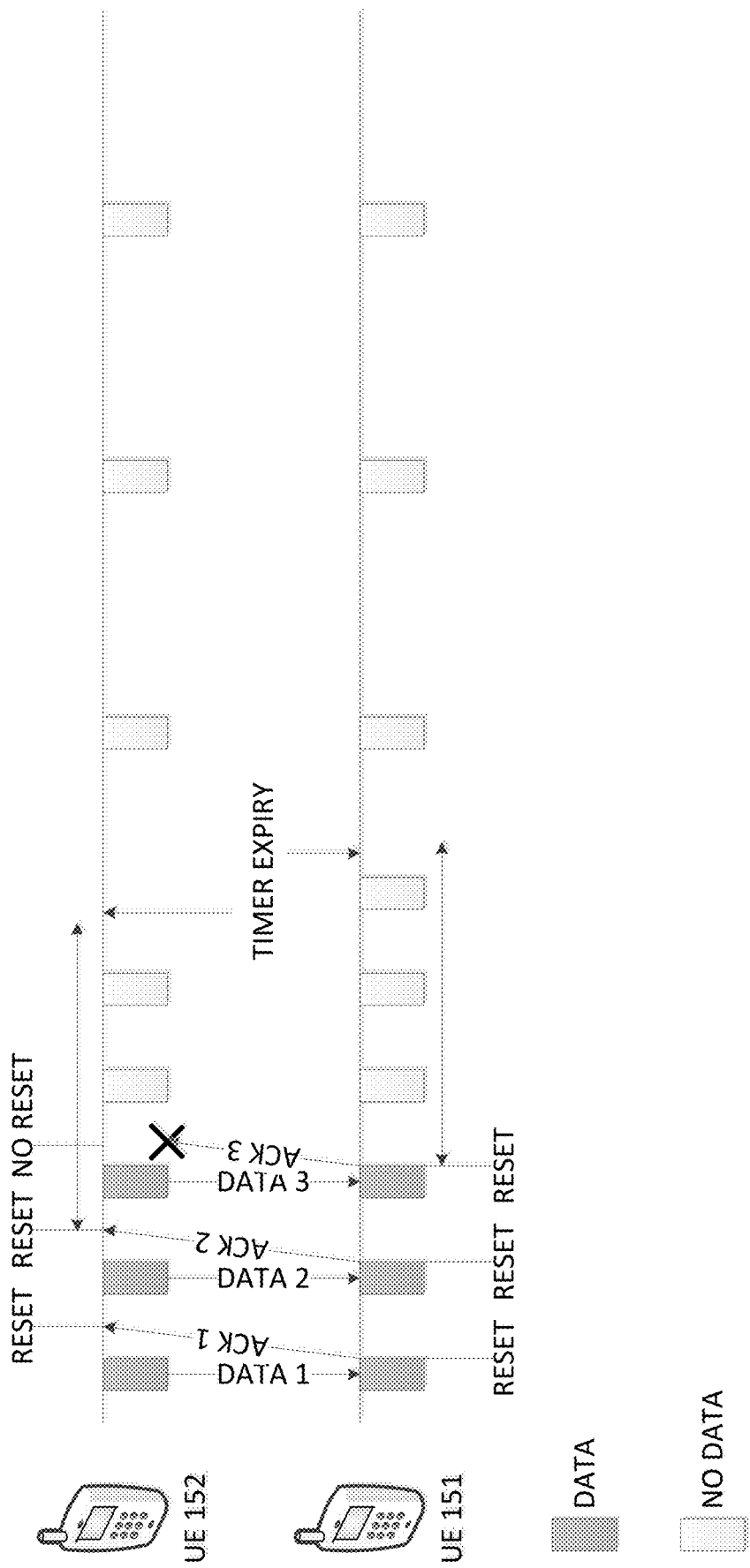
FIG. 5 shows a diagram of a communication scenario according to some embodiments of the disclosure.

FIG. 5 shows a diagram of a scenario for resetting timers in response to acknowledgement of service data reception according to some embodiments of the disclosure.

The acknowledgement can be lost over the air or misinterpreted as a negative acknowledgement (NACK) due to a physical layer error. In such a case, the reception side UE, such as UE 151, will reset and restart the timer while the transmission side UE, such as UE 151, does not due to the loss of the acknowledgment. As a result, the transmission side timer expires before the reception side timer.

FIG. 5 shows three transmissions of data 1, data 2 and data 3 on a short activity cycle time, from a transmission side UE, such as UE 152 to a reception side UE, such as UE 151. The first two data transmissions are successfully acknowledged by the UE 151, such as shown by ACK 1 and ACK 2. However, the acknowledgement ACK 3 for the third data transmission is lost over the air. Accordingly, the UE 152 does not reset the transmission side timer after the third data transmission, and as a result the transmission side timer expires before the reception side timer. Consequently, the UE 151 transitions from the short cycle time to the long cycle time later than the UE 152. However, because the transmission side UE (UE 152) transitions earlier, the reception side UE (UE 151) still monitors all the transmission occasions in which the transmission side UE might transmit. The cost of the desynchronization in this example is simply that the reception UE monitors an extra reception occasion (the sixth reception occasion in the FIG. 5, which occurs when the transmission side UE is not actually configured with a transmission occasion). Accordingly, although the reception side UE consumes a small amount of battery power more than necessary, there is no risk of data loss.

In the example of FIG. 5, the reception side timer in the UE 151 is configured to reset in response to sending an acknowledgement for received service data, and runs continuously until it expires. The expiration of the reception side timer can cause the UE 151 to switch to the long cycle time T2. The transmission side timer in the UE 152 is configured to reset in response to a reception of an acknowledgement from the UE 151, and runs continuously until it expires. The expiration of the transmission side timer can cause the UE 152 to switch to the long cycle time T2.

In some embodiments, the transmission side UE (e.g., UE 152 for the sidelink SL1) can use an explicit indicator to convey the information that no more data is expected to the reception side UE (e.g., UE 151 for the sidelink SL1). In some examples, the transmission side UE can include an end marker in a packet to indicate no more data is expected after the packet.

In an embodiment, the transmission side UE can allocate a transmit buffer for a service to buffer data to transmit for the service. In an example, the transmission side UE may transmit an end marker along with a packet of data when the transmit buffer for the service is empty. In another example, at the transmission side UE, the service is handled by a protocol stack for the service. The protocol stack includes multiple layers, and an upper layer, such as an application layer, in the protocol stack can indicate that no more data is expected for this service for a considerable time to a lower layer, such as a data link layer. Then, the transmission side UE can include an end marker along with a packet of data in response to the indication of no more data for the considerable time.

In an example of a proximity notification service, the proximity notification service in a UE (referred to as transmission side UE of a sidelink) associated with a vehicle can determine that the vehicle has moved out of a proximity of another UE (referred to as reception side UE of the sidelink), such as an UE associated with a pedestrian. The transmission side UE can transmit an end marker in a packet to the reception side UE. The reception side UE can detect the end marker in the received packet, and switch to a low-activity state, such as from the short cycle time T1 to the long cycle time T2.

In an embodiment, the reception side UE can switch to the low-activity state immediately in response to the end marker. In another embodiment, the reception side UE can start a timer in response to the end marker, and can switch to the low-activity state when the timer expires. The use of a timer can help prevent ping-pong between high-activity state (e.g., short cycle time T1) and low-activity state (e.g., long cycle time T2). In an example, the condition of having an empty transmit buffer at the transmission side UE may be transitory, since new data may arrive shortly after the transmit buffer is initially emptied. If an end marker has been sent at the time the transmit buffer was emptied, the new data may force the reception side UE to transition back from a low-activity state (e.g., long cycle time T2) to a high-activity state (e.g., short cycle time T1). The switch back and forth between the high-activity state and the low-activity state is referred to as ping-pong.

Figure 6:
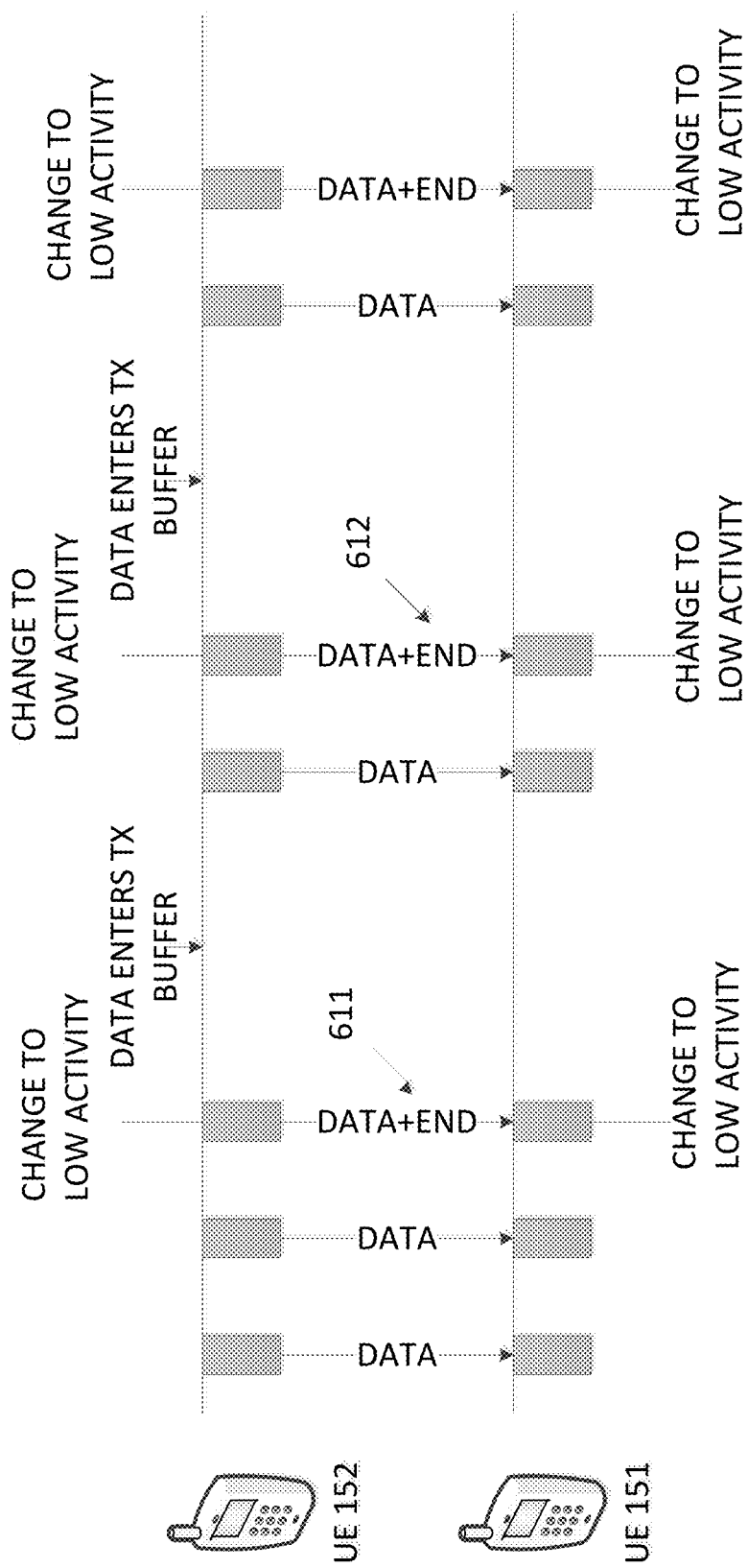
FIG. 6 shows a diagram of a ping-pong scenario in an example.

FIG. 6 shows a diagram of a ping-pong scenario in an example that the UE 152 provides a service over the sidelink SL1 to the UE 151. The UE 152 is the transmission side UE of the sidelink SL1, and the UE 151 is the reception side UE of the sidelink SL1. The UE 152 initially sends several packets of data to the UE 151. When the transmit buffer for the service is empty, the UE 152 sends an end marker with the last packet of data, as shown by 611. The transmission of the end marker at the UE 152 causes the UE 152 to transition from the high activity state (e.g., short cycle time T1) to the low-activity state (e.g., long cycle time T2). The reception of the end marker at the UE 151 causes the UE 151 to transition from the high-activity state (e.g., short cycle time T1) to the low-activity state (e.g., long cycle time T2).

In the FIG. 6 example, shortly afterwards, more data arrives at the transmit buffer of the UE 152 for the UE 152 to transmit. Due to the long cycle time T2, the new data waits in the transmit buffer for a while until a first transmit opportunity (e.g., first transmit occasion in the low activity state), then the new data is transmitted over the sidelink from the UE 152 to the UE 151. The transmission of the new data at the UE 152 causes the UE 152 to transition from the low-activity state (e.g., long cycle time T2) to the high-activity state (e.g., short cycle time T1). The reception of the new data at the UE 151 causes the UE 151 to transition from the low-activity state (e.g., long cycle time T2) to the high-activity state (e.g., short cycle time T1). After a number of packets (such as two packets shown in FIG. 6) have been transmitted, the transmit buffer at the UE 152 is again empty, so the UE 152 sends an end marker again as shown by 612. Shortly thereafter, more data enters the transmit buffer at the UE 152 and the process repeats again.

While the ping-pong process allows the UE 151 to conserve power, the ping-pong process has the effect of delaying the data delivery, since the new data in the transmit buffer may need to wait for the next opportunity on the long cycle time T2. In some examples, in response to the end marker, the transmission side UE and the reception side UE can stay in the high activity state for extra allowance time before transitioning to the low activity state. In an example, allowance timers are used in the transmission side UE and the reception side UE to count the extra allowance time.

Figure 7:
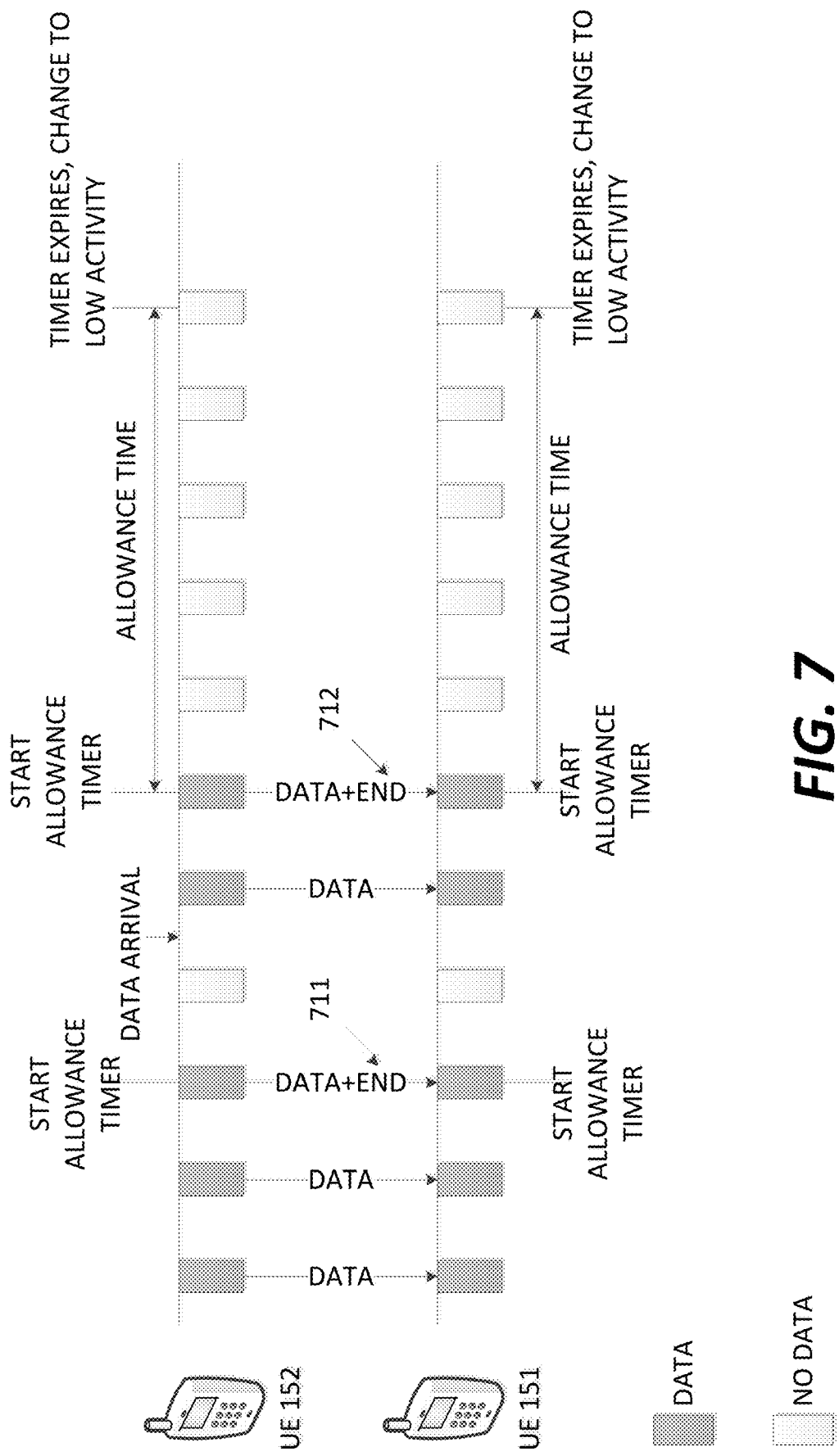
FIG. 7 shows a diagram of using extra allowance time before transitioning according to some embodiments of the disclosure.

FIG. 7 shows a diagram of using extra allowance time before transitioning according to some embodiments of the disclosure. Similar to the example in FIG. 6, the UE 152 provides a service over the sidelink SL1 to the UE 151. The UE 152 is the transmission side UE of the sidelink SL1, and the UE 151 is the reception side UE of the sidelink SL1. The data pattern of the service in FIG. 7 is similar to the example in FIG. 6. The UE 152 initially sends several packets of data to the UE 151. When the transmit buffer for the service is empty, the UE 152 sends an end marker with the last packet of data, as shown by 711.

The transmission of the end marker at the UE 152 causes the UE 152 to start an allowance timer at the transmission side of the sidelink SL1 to count the extra allowance time for staying in the high activity state. The reception of the end marker at the UE 151 causes the UE 151 to start an allowance timer at the reception side of the sidelink SL1 to count the extra allowance time for staying in the high activity state.

In the FIG. 7 example, before the allowance timer at the UE 152 expires, new data enters the transmit buffer of the UE 152. In an example, the allowance timer at the UE 152 is disabled in response to the new data. Due to the high activity state, the new data can be transmitted by the UE 152 in a next transmission occasion of the short cycle time T1, and can be received by the UE 151. In an example, the allowance timer at the UE 151 is disabled in response to the reception of the new data.

In the FIG. 7 example, when the new data has all been transmitted and the transmit buffer is empty again, the UE 152 sends another end marker (the sixth transmit occasion in FIG. 7) as shown by 712. The transmission of the end marker at the UE 152 causes the UE 152 to reset and restart the allowance timer at the transmission side of the sidelink SL1 to count the extra allowance time for staying in the high activity state. The reception of the end marker at the UE 151 causes the UE 151 to reset and restart the allowance timer at the reception side of the sidelink SL1 to count the extra allowance time for staying in the high activity state.

In the FIG. 7 example, no new data enters the transmit buffer for the service before the allowance timer at the UE 152 expires. The expiration of the allowance timer at the UE 152 causes the UE 152 to transition from the high activity state (e.g., short cycle time T1) to the low activity state (e.g., long cycle time T2).

Further, in the FIG. 7 example, no new data is received by the UE 151 before the allowance timer at the UE 151 expires. The expiration of the allowance timer at the UE 151 causes the UE 151 to transition from the high activity state (e.g., short cycle time T1) to the low activity state (e.g., long cycle time T2).

In the FIG. 7 example, the UE 151 (reception side UE) has extra allowance time in the high activity state that may cause a relatively larger power consumption. The extra allowance time allows quicker delivery of the new data that arrives while the allowance timer is running to avoid the ping-pong scenario. It is noted that the optimal setting of the allowance timer to balance the power consumption against the data latency will vary according to the traffic pattern of the service. In some examples, the allowance timer value may be a parameter of the service, and to be set in accordance with operator policy and/or the configuration of each service. In an example, a single transmission side UE or a reception side UE may be involved in a plurality of services, and each of the services may have its own value for the allowance timer.

It is noted that, in some examples, the allowance timer value may be specific to a service, specific to a connection, or specific to a particular UE pair (transmission UE and reception UE). In an example, a reception UE may operate multiple allowance timers respectively, each allowance timer corresponding to a particular reception pattern. The allowance timers may expire independently, resulting in changes in the aggregated receive activity pattern of the reception side UE. In some embodiments, the end marker may be specific to a service, specific to a connection, or specific to a particular UE pair. The transmission side UE can send the end marker to indicate an end of data only for the specific service, connection, or UE pair.

In some embodiments, the transmission side UE can provide more detailed information about the transmit buffer status to the reception side UE. In some examples, the transmission side UE can provide a buffer status report (BSR) of the transmission buffer to the reception side UE.

In an embodiment, the transmission side UE sends the BSR to the reception side UE along with a data transmission on the sidelink for the service. The reception UE can determine when more data are expected based on the BSR. In an example, the reception side UE can determine that the received data volume is the same as indicated by the BSR, and infer that all the data has now been received and the transmit buffer at the transmission side UE is empty and the data transmission is finished. This inference may cause the same steps as described above for the end marker, e.g. an immediate transition to a low-activity state or starting an allowance timer.

According to an aspect of the disclosure, the reception side UE is also configured to adjust a monitoring window in response to reception failure. In particular, a transmission of data from the transmission side UE to the reception side UE over the sidelink may happen near the end of the on-duration (a time slot for a transmission occasion) of the transmit activity cycle, and the reception side UE detects a reception failure of the data, then a retransmission of the data is required, and the retransmission may occur outside the on-duration of the transit activity cycle. In such a case, the reception side UE needs to continue monitoring beyond the normal on-duration. In an embodiment, a timer is used and the timer is setup to count a retransmission allowance time. The retransmission allowance time is determined to guarantee that the reception side UE can receive a retransmission in response to a reception failure. In an example, when the reception side UE detects a reception failure, the reception side UE sends a negative acknowledgement (NACK) to the transmission side UE, and starts the timer for tracking the retransmission allowance time. When the transmission side UE detects the NACK, the transmission side UE can retransmit the data. The reception side UE continuously to monitor the radio interface before the retransmission allowance timer expires. Thus, even though the on-duration of the activity pattern ends, the reception side UE keeps in the active receiving state as long as the retransmission allowance timer does not expire in order to receive the retransmission data.

It is noted that communication on the sidelink interface relies on a resource pool that refers to a set of radio resources allowed for using in sidelink communication. A resource pool may be associated with one or more services, or associated with characteristics of the transmission side UE and/or the reception side UE. The transmit activity pattern and the receive activity pattern take place within an appropriate resource pool. For example, a resource pool may be allocated for the use of UEs associated with pedestrians (P-UEs) and is referred to as P-UE resource pool. The time dimension of the P-UE resource pool can define a receive activity pattern for the P-UEs. Depending on the nature of the P-UE services, a P-UE may or may not be required to monitor the entire P-UE resource pool. In an example, if P-UEs are expected to monitor for broadcast transmissions of connectionless services from previously unknown peer UEs, thus it may be necessary for the P-UEs to monitor the P-UE resource pool in its entirety at all times. In such a case, the P-UE resource pool in its time dimension may be viewed as a baseline reception activity pattern for all P-UEs. Additional services, such as connection based services may use a different resource pool and impose requirements to receive in additional occasions, so that a P-UE may need to synthesize a monitoring pattern from the P-UE resource pool together with one or more connection-based services with known peer UEs.

Figure 8:
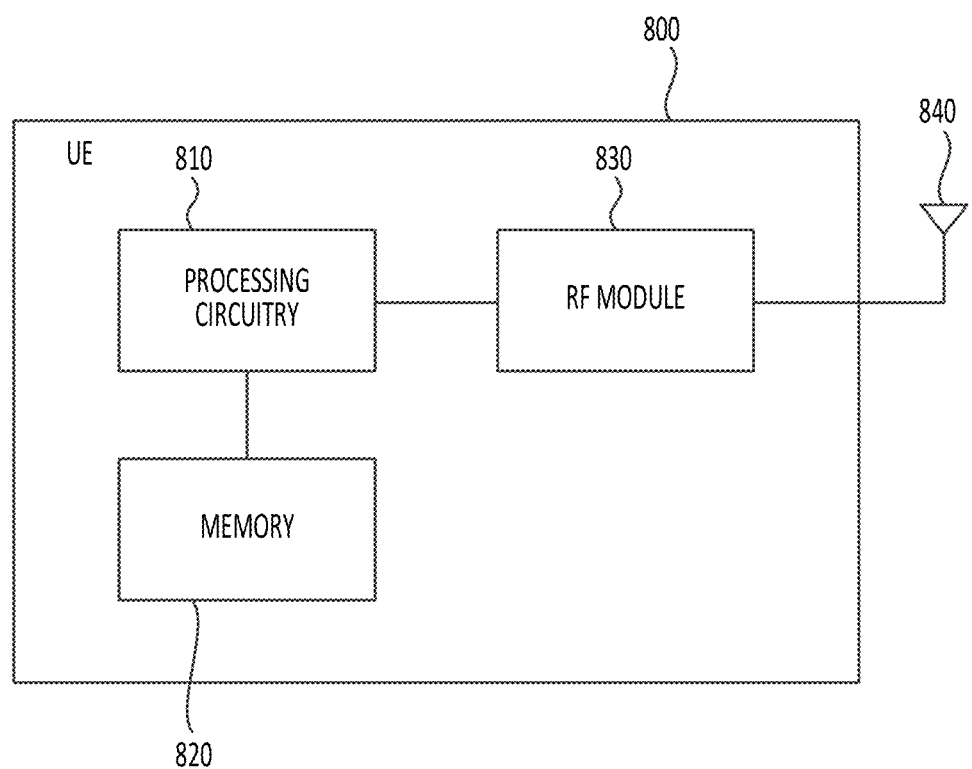
FIG. 8 shows a block diagram of a user equipment device according to embodiments of the disclosure.

FIG. 8 shows a block diagram of a UE 800 according to embodiments of the disclosure. In an example, the UE 151, the UE 152, the UE 153 and the UE 154 can be respectively configured in the same manner as the UE 800. The UE 800 can be configured to perform various functions in accordance with one or more embodiments or examples described herein. Thus, the UE 800 can provide means for implementation of techniques, processes, functions, components, systems described herein. For example, the UE 800 can be used to implement functions of the UE 151, the UE 152, the UE 153 and the UE 154 in various embodiments and examples described herein. The UE 800 can be a general purpose computer in some embodiments, and can be a device including specially designed circuits to implement various functions, components, or processes described herein in other embodiments. The UE 800 can include processing circuitry 810, a memory 820, a radio frequency (RF) module 830, and an antenna 840.

In various examples, the processing circuitry 810 can include circuitry configured to perform the functions and processes described herein in combination with software or without software. In various examples, the processing circuitry can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 810 can be a central processing unit (CPU) configured to execute program instructions to perform various functions and processes described herein. Accordingly, the memory 820 can be configured to store program instructions. The processing circuitry 810, when executing the program instructions, can perform the functions and processes. The memory 820 can further store other programs or data, such as operating systems, application programs, and the like. The memory can include transitory or non-transitory storage medium. The memory 820 can include a read only memory (ROM), a random access memory (RAM), a flash memory, a solid state memory, a hard disk drive, an optical disk drive, and the like.

The RF module 830 can include transceiver circuitry that are configured to receive processed data signal from the processing circuitry 810 and transmit signals in a beam-formed wireless communication network via an antenna 840, or receive and process signals from antenna 840 and provides processed signals to the processing circuitry 810. The RF module 830 can include various circuit, such as receiving circuitry, transmitting circuitry, a digital to analog convertor (DAC), an analog to digital converter (ADC), a frequency up converter, a frequency down converter, filters, and amplifiers for reception and transmission operations, and the like. The RF module 830 can include multi-antenna circuitry (e.g., analog signal phase/amplitude control units) for beamforming operations. The antenna 840 can include one or more antenna arrays.

The UE 800 can optionally include other components, such as input and output devices, additional or signal processing circuitry, and the like. Accordingly, the UE 800 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for wireless communication, comprising:
   receiving, by a first mobile device, a first indication of a first transmit activity pattern associated with a second mobile device that transmits data to the first mobile device via a radio interface without passing through a base station, the first indication indicating a first scheduled data transmit cycle of the first transmit activity pattern of the second mobile device;
   receiving, by the first mobile device, a second indication of a second transmit activity pattern associated with a third mobile device that transmits data to the first mobile device directly via the radio interface, the second indication indicating a second scheduled data transmit cycle of the second transmit activity pattern of the third mobile device:
   computing, by the first mobile device, a first receive activity pattern including a first receive active portion in time domain for receiving the data transmitted from the second mobile device and the third mobile device, the first receive active portion of the first receive activity pattern being inclusive of at least a first transmit active portion of the first scheduled data transmit cycle of the first transmit activity pattern and a second transmit active portion of the second scheduled data transmit cycle of the second transmit activity pattern; and monitoring, by the first mobile device, the radio interface according to the first receive activity pattern.

2. The method of claim 1, wherein the first scheduled data transmit cycle of the first transmit activity pattern is adjusted with an increased cycle time, and the method further comprises:

resetting, by the first mobile device, a timer in response to a reception of a packet of data transmitted from the second mobile device;

adjusting, by the first mobile device, the first receive active portion of the first receive activity pattern to include the first transmit active portion of the adjusted first scheduled data transmit cycle with the increased cycle time; and monitoring, by the first mobile device, the radio interface according to the adjusted first receive activity pattern when and after the timer expires.

3. The method of claim 1, wherein the first scheduled data transmit cycle of the first transmit activity pattern is adjusted with an increased cycle time, and the method further comprises:

receiving, by the first mobile device, an end indication of service data transmission from the second mobile device;

updating, by the first mobile device, the first receive active portion of the first receive activity pattern to include the first transmit active portion of the adjusted first scheduled data transmit cycle with the increased cycle time; and monitoring, by the first mobile device, the radio interface according to the updated first receive activity pattern.

4. The method of claim 3, further comprising:

starting, by the first mobile device, a timer in response to the end indication;

monitoring, by the first mobile device, the radio interface according to the first receive activity pattern before the timer expires; and monitoring, by the first mobile device, the radio interface according to the updated first receive activity pattern when and after the timer expires.

5. The method of claim 3, wherein the end indication comprises at least one of:

an end marker in a data transmission; and a buffer status report that indicates data in a transmit buffer of the second mobile device has been transmitted to and received by the first mobile device.

6. The method of claim 1, further comprising:

detecting, by the first mobile device, a reception failure of a packet of data transmitted from the second mobile device;

sending, by the first mobile device, a negative acknowledgement (NACK) to the second mobile device in response to the reception failure; and monitoring, by the first mobile device, the radio interface after the sending of the NACK, for a time duration that allows a reception of a retransmission of the data from the second mobile device.

7. The method of claim 1, wherein the first receive activity pattern is inclusive of at least one of a time dimension of a resource pool for a connectionless service and a transmit activity pattern associated with a connection-based service.

8. The method of claim 1, further comprising at least one of:

receiving, by the first mobile device, the first indication in a message of a sidelink radio resource control (RRC) protocol; and receiving, by the first mobile device, the first indication in a control element of a sidelink medium access control (MAC) protocol.

9. The method of claim 1, further comprising:

monitoring, by the first mobile device, the radio interface in an on-duration of the first receive activity pattern; and powering off, by the first mobile device, receiving circuitry of the first mobile device in an off-duration of the first receive activity pattern.

10. An apparatus, comprising:

receiving circuitry configured to receive and process radio signals; and processing circuitry configured to:

receive a first indication of a first transmit activity pattern associated with a second apparatus that transmits data to the apparatus via a radio interface without passing through a base station, the first indication indicating a first scheduled data transmit cycle of the first transmit activity pattern of the second apparatus;

receive a second indication of a second transmit activity pattern associated with a third apparatus that transmits data to the apparatus directly via the radio interface, the second indication indicating a second scheduled data transmit cycle of the second transmit activity pattern of the third apparatus;

compute a first receive activity pattern including a first receive active portion in time domain for receiving the data transmitted from the second apparatus and the third apparatus, the first receive active portion of the first receive activity pattern being inclusive of at least a first transmit active portion of the first scheduled data transmit cycle of the first transmit activity pattern and a second transmit active portion of the second scheduled data transmit cycle of the second transmit activity pattern; and control the receiving circuitry to monitor the radio interface according to the first receive activity pattern.

11. The apparatus of claim 10, wherein the first scheduled data transmit cycle of the first transmit activity pattern is adjusted with an increased cycle time, and the processing circuitry is configured to:

reset a timer in response to a reception of a packet of data transmitted from the second apparatus;

adjust the first receive active portion of the first receive activity pattern to include the first transmit active portion of the adjusted first scheduled data transmit cycle with the increased cycle time; and control the receiving circuitry to monitor the radio interface according to the adjusted first receive activity pattern when and after the timer expires.

12. The apparatus of claim 10, wherein the first scheduled data transmit cycle of the first transmit activity pattern is adjusted with an increased cycle time, and the processing circuitry is configured to:

receive an end indication of service data transmission from the second apparatus;

update the first receive active portion of the first receive activity pattern to include the first transmit active portion of the adjusted first scheduled data transmit cycle with the increased cycle time; and control the receiving circuitry to monitor the radio interface according to the updated first receive activity pattern.

13. The apparatus of claim 12, wherein the processing circuitry is configured to:

start a timer in response to the end indication;

control the receiving circuitry to monitor the radio interface according to the first receive activity pattern before the timer expires; and control the receiving circuitry to monitor the radio interface according to the updated first receive activity pattern when the timer and after expires.

14. The apparatus of claim 12, wherein the end indication comprises at least one of:

an end marker in a data transmission; and a buffer status report indicating that data in a transmit buffer of the second apparatus has been transmitted to and received by the apparatus.

15. The apparatus of claim 10, wherein the processing circuitry is configured to:

detect a reception failure of a packet of data transmitted from the second apparatus;

control the receiving circuitry to send a negative acknowledgement (NACK) to the second apparatus in response to the reception failure; and control the receiving circuitry to monitor the radio interface after sending the NACK, for a time duration that allows a reception of a retransmission of the data from the second apparatus.

16. The apparatus of claim 10, wherein the first receive activity pattern is inclusive of at least one of a time dimension of a resource pool for a connectionless service, and a transmit activity pattern associated with a connection-based service.

17. The apparatus of claim 10, wherein:

the receiving circuitry is configured to receive the first indication in at least one of a message of a sidelink radio resource control (RRC) protocol and a control element of sidelink medium access control (MAC) protocol.

18. The apparatus of claim 10, wherein the processing circuitry is configured to:

control the receiving circuitry to monitor the radio interface in an on-duration of the first receive activity pattern; and control the receiving circuitry to enter a power saving mode in an off-duration of the first receive activity pattern.

* * * * *